US 8,386,374 B2

(12) United States Patent
O'Callahan

(10) Patent No.: US 8,386,374 B2
(45) Date of Patent: Feb. 26, 2013

(54) SYSTEM AND METHOD FOR CREATING AND TRADING PACKAGED COLLAR OPTIONS ON AN EXCHANGE

(75) Inventor: Dennis M. O'Callahan, Evanston, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

(21) Appl. No.: 13/399,217

(22) Filed: Feb. 17, 2012

(65) Prior Publication Data

US 2012/0265665 A1    Oct. 18, 2012

Related U.S. Application Data

(60) Continuation of application No. 12/481,388, filed on Jun. 9, 2009, now Pat. No. 8,121,934, which is a division of application No. 11/122,511, filed on May 4, 2005, now Pat. No. 7,562,046.

(51) Int. Cl.
G06Q 20/10 (2012.01)
(52) U.S. Cl. .......................................... 705/37; 705/35
(58) Field of Classification Search ................ 705/35, 705/37
See application file for complete search history.

(56) References Cited

U.S. PATENT DOCUMENTS

| | | | |
|---|---|---|---|
| 7,039,610 B2 | 5/2006 | Morano et al. | |
| 7,260,554 B2 | 8/2007 | Morano et al. | |
| 7,389,264 B2 | 6/2008 | Kemp, II et al. | |
| 7,562,046 B2 | 7/2009 | O'Callahan | |
| 2006/0253355 A1 | 11/2006 | Shalen | |
| 2006/0253359 A1 | 11/2006 | O'Callahan | |
| 2006/0253367 A1 | 11/2006 | O'Callahan et al. | |
| 2006/0253368 A1 | 11/2006 | O'Callahan et al. | |
| 2006/0253369 A1 | 11/2006 | O'Callahan | |
| 2006/0253370 A1 | 11/2006 | Feuser et al. | |

OTHER PUBLICATIONS

Money Digest, Bear Collar can protect your profits [Combined put option—call option] Sep. 1998.
Demeterfi, Kresimir, et al., "More Than You Ever Wanted to Know About Volatility Swaps," Goldman Sachs Quantitative Strategies Research Notes, Mar. 1999.
CBOE Futures Exchange letter dated May 17, 2004, to Commodity Futures Trading Commission with accompanying pages containing rules, terms, and conditions for a new product to be traded on the CBOE Futures Exchange, 8 pages.
Press Release article, "CBOE Announces Launch of Futures on VIX: First Tradable Volatility Product Will be Offered on New CBOE Futures Exchange," Sep. 5, 2003, two pages.

Primary Examiner — Jagdish Patel
(74) Attorney, Agent, or Firm — Brinks Hofer Gilson & Lione

(57) ABSTRACT

A method of creating and trading packaged standard option collars on an exchange is provided, as well as a trading facility for trading such packaged standard option collars. Collars are created by identifying an underlying asset, a first leg of a collar is determined by determining the desired strike price for the first leg and selecting a standard option contract traded on the exchange having a strike price closest to the desired strike price. The second leg is determined by selecting another standard option, the opposite of the first leg, having an option price substantially offsetting the option price of the first leg. Once the legs of the collar have been selected the collar package may be listed on the exchange, and orders for the collars may be processed by matching orders for opposite positions in the collar.

19 Claims, 7 Drawing Sheets

| | | | | | | | | | |
|---|---|---|---|---|---|---|---|---|---|
| SPX LEVEL | 1206.8 | | | | | | | | |
| CALL STRIKE CALCULATION | 1267.14 | ← 404 | | | | | | | |
| CALL BELOW CALCULATION | 1260 | ← 406 | | | | | | | |
| CALL ABOVE CALCULATION | 1275 | ← 408 | | | | | | | |
| CLOSEST TO 5% OTM CALL | 1260 | ← 410 | | | | | | | |
| PUT STRIKE BASED ON ZERO COST CRITERIA | 1110 | ← 412 | | | | | | | |
| | | | | | | | | | |
| MONTH | STRIKE PRICE | WRAP SYMBOL | LAST | BID | OFFER | LAST | BID | OFFER | |
| 413 → APR | 1110 | SPT | 0 | 99.3 | 101 | 0 | 0.9 | 1.4 | |
| 414 → APR | 1260 | SZP | 1.5 | 1.3 | 1.8 | 50 | 50.9 | 52.9 | |
| | | | | | | | | | |
| S & P 500 (SPX) LAST | 1206.8 | | | | | | | | |
| 5% OTM CALL BID | 1.3 | ← 416 | | | | | | | |
| COLLAR PUT ASK | 1.7 | ← 418 | | | | | | | |
| COLLAR BID PRICE | 0.4 | | | | | | | | |
| | | | | | | | | | |
| 5% OTM CALL OFFER | 1.8 | ← 420 | | | | | | | |
| COLLAR PUT BID | 1.2  0.9 | ← 422 | | | | | | | |
| COLLAR | -0.6  0.9 | | | | | | | | |
| | 424 ↗  BID | 426 ↗  ASK | | | | | | | |
| QUOTES COLLAR ("CXX") | 0.4 | -0.6 | | | | | | | |
| 1. QUOTE OF BASED ON SPX AT 1206.8 ON 3/14/05 | | | | | | | | | |
| 2. COLLAR BASED ON APRIL 2005 OPTIONS | | | | | | | | | |
| 3. CALL DETERMINED AS CLOSED TO 5% OUT-OF-THE-MONEY ("OTM") | | | | | | | | | |
| 4. PUT DETERMINED BY SCANNING PUT SERIES TO DETERMINED CLOSEST TO ZERO COST COLLAR | | | | | | | | | |
| 5. CONTINUOSLY QUOTED AS HYPOTHETICAL CXX SYMBOL | | | | | | | | | |
| 6. A MARKET MAKER MAY QUOTE BIDS/ OFFERS IN PLACE OF QUOTES BASED ON MARKET PRICES (THE ABOVE EXAMPLE) | | | | | | | | | |

FIG. 9

SYSTEM AND METHOD FOR CREATING AND TRADING PACKAGED COLLAR OPTIONS ON AN EXCHANGE

CROSS-REFERENCE TO RELATED APPLICATIONS

This application is a continuation of U.S. application Ser. No. 12/481,388, filed Jun. 9, 2009, now U.S. Pat. No. 8,121, 934, which is a divisional of U.S. application Ser. No. 11/122, 511, filed May 4, 2005, now U.S. Pat. No. 7,562,046, wherein the entirety of each of the aforementioned applications is incorporated herein by reference.

FIELD OF THE INVENTION

The present invention relates to a method of creating and trading zero-cost, or near-zero-cost collars as packaged investment instruments as well as to trading facilities for trading such packaged collars.

BACKGROUND

Collars are a mechanism by which investors may manage the risk inherent in owning an underlying asset such as a stock. A collar comprises two legs. The first is a long, out-of-the-money, put option, which is an option to sell the underlying asset at a set price. The put option leg protects against declining prices. The second leg is a short, out-of-the-money, call option which gives the right to purchase the underlying asset at a fixed price to another. The proceeds from the sale of the call option maybe used to finance the purchase of the put option, resulting in a zero-cost, or near-zero cost transaction.

In order to understand the risk managing characteristics of collars, a brief overview of options contracts and how they can be used to limit risk is helpful. Options contracts are well known financial instruments. An option is a contract that grants the right, but not the obligation, to buy or sell an underlying asset at a specified price on or before a certain date. There are basically two types of options: call options and put options. A call option confers the right to purchase the underlying asset at a specified price. A put option confers the right to sell the underlying asset at a specified price. In both cases the specified price is known as the "strike price."

Options are contracts between investors. A first investor must purchase an option from second investor. The first investor having purchased the option from the second investor is said to have taken a long position relative to the option and the second investor is said to have taken a short position. The amount paid by the long investor to the short investor is known as the option price. Whether or not the option is exercised (i.e. the option is invoked to either purchase or sell the underlying asset) is solely in the discretion of the long investor holding the option. A call option becomes valuable, is "in-the-money," if the market price of the underlying asset rises above the strike price. Otherwise, the option is "out-of-the-money" and has no value. When a long investor elects to exercise an in-the-money call option, the long investor pays the strike price to the short investor and the short investor delivers the underlying asset to the long investor. Conversely a put option becomes valuable, is "in-the-money" when the market price of the underlying asset falls below the strike price of the option. Otherwise, the option is "out-of-the-money" and has no value. When a long investor elects to exercise an in-the-money put option, the short investor must pay the strike price to the long investor and the long investor delivers the underlying asset to the short investor.

In many cases the parties may choose to forego delivery of the underlying asset and settle the contract in cash. Cash settlement merely requires the short investor to pay the long investor the difference between the strike price and the prevailing market price of the underlying asset. If the option expires out-of-the-money, the market price of the underlying remains below the strike price of a call option or above the strike price of a put option, the short investor pays nothing to the long investor and retains the option price.

Options can be highly speculative investments. They can also be used as tools for managing risk. Zero-cost or near-zero-cost collars are a low cost mechanism that can be used to limit the risk that an asset will lose a significant amount of its value. In order to understand the risk management potential of options collars it is helpful to review the risk-reward curves for various investments. FIG. 1 is a graph 100 showing the risk-reward curve 102 for an investor who has invested directly in an asset. The asset may be, for example, a share of stock in a hypothetical company XYZ Corp. The horizontal axis of the graph represents the market price of the asset, and the vertical axis represents the investor's profits or losses from his or her investment. In this example, the investor purchased the asset at a market value of $50. The investor's profits or losses are tied directly to the market price of the asset. If the market price rises above $50 the investor sees a profit. If the market price falls below $50 the investor sustains a loss. Profits or losses are linear, based solely on the market price of the asset. From curve 102 it can be seen that the investor's maximum risk is $50, the total amount of his or her investment. The potential gain, however, is substantially unlimited.

FIG. 2 is a graph 110 showing the risk-reward curve 112 for an investor who has taken a long position in a call option. The horizontal axis represents the market price of the underlying asset, e.g. a share of XYZ Corp. The example shown has a strike price of $50 and an option price of $10. If the market price of the underlying asset remains below the $50 strike price, the option remains worthless and the long investor risks losing the $10 cost of the option. This condition is represented by the horizontal portion 114 of the risk-reward curve 112. If the market price of the underlying rises above the strike price however, the option is in-the-money and has value. This situation is represented by the positive slope portion 116 of the risk-reward curve. The value of the in-the-money option is equal to the difference between the market value of the underlying asset and the strike price. When this difference exceeds the option price, $10, the long investor begins to see a profit. As is visually quite clear from the graph, the long investor's risk is limited to the option price, but the potential gain is essentially unbounded.

FIG. 3 is a graph 120 showing the risk-reward curve 122 for an investor who has taken the opposite position from the investor of FIG. 2, namely a short position in a call option for XYZ Corp. The risk-reward curve 122 is the inverse of curve 112 shown in FIG. 2. The risk-reward curve 122 also comprises two distinct legs. The first leg 124 corresponds to the option being out-of-the-money, the market price of the underlying asset remaining below the strike price. Under these market conditions the option is worthless and the short investor retains the $10 option price paid by the long investor. Once the market price of the underlying asset moves above the strike price, however, the option acquires value and the short investor is obligated to pay the long investor an amount equal to the difference between the market price of the underlying asset and the strike price. If this amount exceeds the $10 options price the short investor suffers a loss. The negative slope portion 126 of the risk-reward curve corresponds to the call option being-in-the-money. As the second leg 126 of the risk-reward curve 122 shows, the potential loss to the short investor is substantially unlimited, whereas the potential gain is limited to the received option price.

Next we turn to FIG. 4 which is a graph 130 showing a risk-reward-curve 132 for an investor who has taken a long position in a put option. In this case the option again has a strike price of $50 and a $10 option price. Since a put option represents the right to sell the underlying asset at the strike price, a put option is in-the-money when the market price of the underlying asset drops below the strike price. As with the risk-reward curves in FIGS. 2 and 3, curve 132 comprises two distinct legs. The first negatively sloped leg 134 corresponds to the option being in-the-money, the market price of the underlying asset below the strike price of the put option. The second horizontal leg 136 corresponds to the option being out-of-the-money, the value of the underlying asset above the strike price of the put option. The maximum return on a put option is the strike price minus the option price. This assumes that the underlying asset has completely lost its value and become worthless. As long as the difference between the strike price and the value of the underlying asset exceeds the option price, in this case $10, the long investor who purchased the put option realizes a profit. If the value of the underlying asset remains above the strike price, the put option is worthless and the long investor experiences a loss equal to the price of the option.

Finally, FIG. 5 shows a graph 140 of a risk-reward curve 142 for an investor who takes a short position in a put option. Again, the risk-reward curve comprises two distinct legs. The first leg 144 occurs when the put option is in-the-money, the market price of the underlying asset has moved below the strike price. The second leg 146 corresponds to the option being out-of-the-money. When the option is out-of-the-money the option is worthless and the short investor retains the option price, realizing a small profit. When the put option is in-the-money, however, the short investor is obligated to purchase the underlying asset at the strike regardless of the prevailing market price. If the difference between the strike price and the prevailing market price of the underlying asset is greater than the option price paid for the option, the short investor experiences a loss. The maximum loss the short investor can sustain if the underlying asset loses all of its value and becomes worthless is equal to the strike price minus the option price.

Options may be employed to manage the risk of changes in the value of an underlying asset. For example, referring back to FIG. 1, where an investor purchases a share of XYZ Corp. for $50. Holding this single share, the investor's maximum risk exposure is $50. If the company goes out of business and the stock becomes worthless the investor loses his entire $50 investment. If, however, the investor purchases a put option with a strike price of, for example $40, the investor locks in the right to sell the stock at $40 regardless of any further price declines. The investor's maximum loss would be the cost of the put option $10 plus the difference between the purchase price of the asset ($50) and the strike price of the put option ($40). In this case a total of $20. The investor's maximum loss can be further limited by financing the $10 purchase of a put option by a corresponding sale of a call option. If the investor sells a call option for the same price as the put option described above, he has limited his downside risk at essentially "zero cost." The transaction is zero-cost in the sense that the downside risk protection did not require a cash outlay. In reality, however, the downside risk protection was purchased at the expense of up-side potential. By selling a call option the investor is obligated to sell the underlying asset (his share of XYZ Corp.) at the strike price of the call option regardless of how high the price of the stock rises. Thus, the investor's upside potential is limited to the strike price of the call option.

The arrangement just described is known as a zero cost collar. It is zero cost since the sale of the call option is used to offset the cost of purchasing the put option. The arrangement places a "collar" on the value of the investor's investment, placing a finite limit on both downside losses and upside gains. FIG. 6 shows a graph 150 of a risk-reward-curve 152 of a zero costs collar as described. The risk-reward curve 152 is essentially the sum of the risk-reward curve 152 for the underlying asset (FIG. 1), the risk-reward curve 122 for short call option (FIG. 3) and the risk-reward curve 130 for the long put option (FIG. 4). The risk-reward curve 152 comprises 3 segments. The first 154 represents the investor's maximum loss if the price of the underlying asset falls below the strike price of the long put option. The third segment 158 represents the investor's maximum gain if the price of the underlying asset rises above the strike price of the short call option. The narrow band 156 in the middle represents the investor's risk exposure to price fluctuations between the strike price of the put option and the strike price of the call option. With the zero cost collar the investors' maximum losses and maximum gains are limited to this narrow range 156.

Collars have been traded in the over-the-counter market. Investors may assemble the various pieces using customized contracts to create various offsetting collar positions. Heretofore, collars have not been traded on exchanges. Trading such a product on an exchange is complicated by the fact that exchanges are limited to trading standard option contracts having prescribed strike-price intervals. Using standard option contracts it is difficult to assemble a package of offsetting positions. This complication is absent in the over-the-counter market since dealers are free to customize contracts as necessary. Such customization, however, may limit the liquidity of the over the counter packaged collar options.

SUMMARY

A method of creating and trading packaged standard options collars on an exchange is provided. In an embodiment the packaged standard options collars may include opposite positions in out-of-the-money call and out-of-the-money put option contracts based on the same underlying asset. Thus, a first investor will take a short position in a standard call option and a long position in a standard put option, while a second investor taking the opposite side of the collar will take a long position in the standard call option and a short position in the standard put.

A first leg of the collar is selected having a strike price that is out-of-the-money by a desired amount. The second leg of the collar is then selected based on the option price of the first leg. The second leg is an option having an option price that substantially offsets the option price of the first leg. A desired strike price may be calculated based on the previous day's closing price of the underlying asset, or the desired strike price maybe calculated continuously in real-time.

Because the legs of the collar will be standard option contracts traded on the exchange, it may not be possible to find a standard option having the exact strike price as that desired for the first leg. In this case, the standard option contract having a strike price nearest the desired strike price is selected. Similarly, when determining the second leg of the collar, there may not be a standard option having a price that will exactly offset the price of the first leg. Therefore, a standard option having an option price that most nearly offsets the option price of the first leg is selected. For establishing the option price, the mid-point between the current bid and current offer may be used.

According to one aspect of the invention, a method for creating and trading packaged standard option collars begins with the step of identifying the underlying asset on which the collar will be based. A first leg of the collar, either a standard call option or a standard put option, is selected based on the strike setting price of the underlying asset and a "moneyness factor" which determines how far out-of-the-money the strike price of the first leg is to be. The next step is to select the second leg of the collar based on the option price of the first leg. The second leg is a standard option of the opposite type as the first leg (a put option if the first leg is a call option, a call option if the first leg is a put option) having an option price that substantially offsets the option price of the first leg. Once the two legs have been selected, the strike prices of the two legs are published and the collar may be listed on an exchange. Quotes may be disseminated to investors. Investors may place orders for collars, and the orders may be executed by matching orders for opposite positions. Executing a collar includes executing both legs of the collar. Post trade processing may include separate trading of the individual legs of the collar, or the maintenance of the legs as an separable package of options. The options that make up the legs of the collar may be tagged for monitoring purposes so that the exchange and or investors may track whether contracts are or once were part of a packaged collar.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the appended claims.

BRIEF DESCRIPTION OF THE DRAWINGS

FIG. 9 is a listing of a package standard option collar according to the present invention.

DETAILED DESCRIPTION OF THE PRESENTLY PREFERRED EMBODIMENTS

Methods of creating and trading zero-cost or near-zero cost option collars on an exchange, as well as a system for trading such packaged options on an electronic trading facility are set forth below. An exchange based collar according to one embodiment pairs the sale of an out-of-the-money call option with the purchase of a similarly priced out-of-the-money put option.

Figure 1:
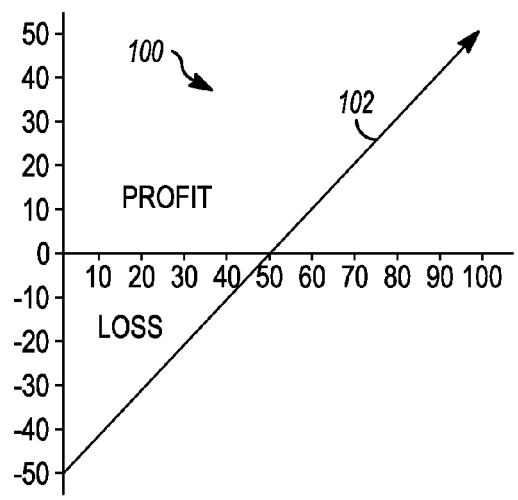
FIG. 1 is a graph showing potential returns from the direct purchase of an asset.
Figure 2:
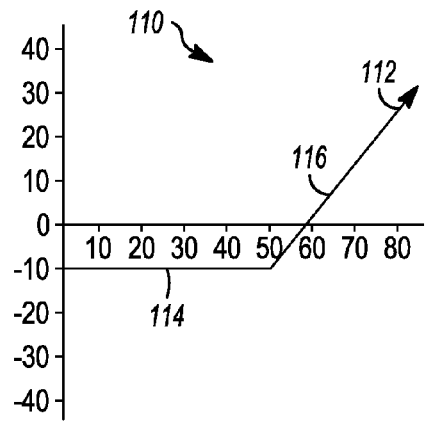
FIG. 2 is a graph showing potential returns from the purchase of a call option.
Figure 3:
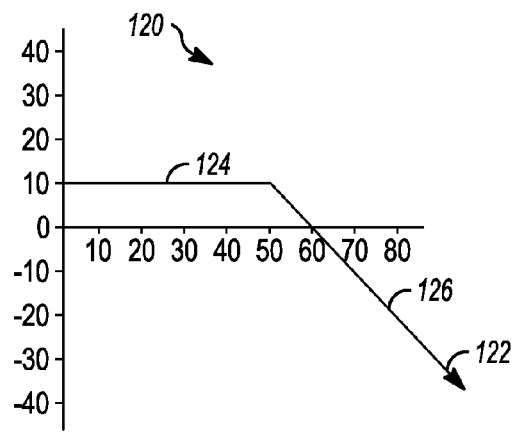
FIG. 3 is a graph showing potential returns from the sale of a call option.
Figure 4:
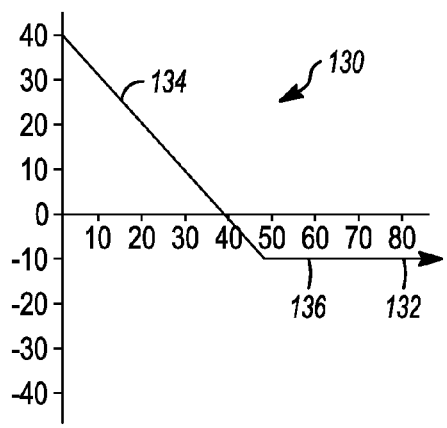
FIG. 4 is a graph showing potential returns from the purchase of a put option.
Figure 5:
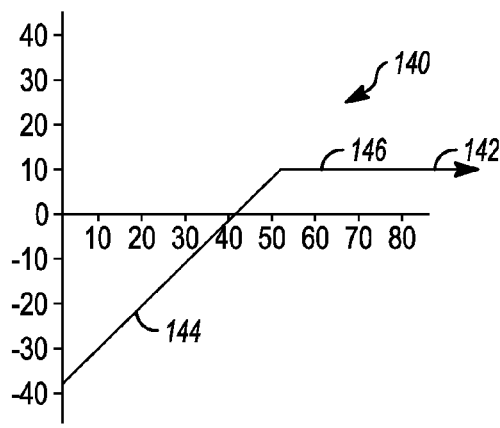
FIG. 5 is graph showing potential returns from the sale of a put option.
Figure 6:
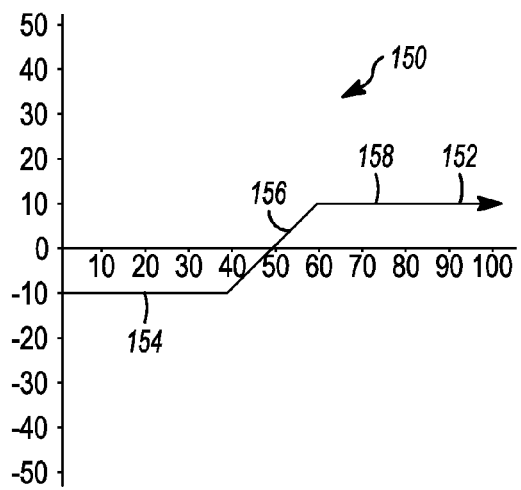
FIG. 6 is a graph showing the potential returns from the purchase of an asset and an option collar comprising the sale of a call option on the asset and the purchase of a put option on the asset.
Figure 7:
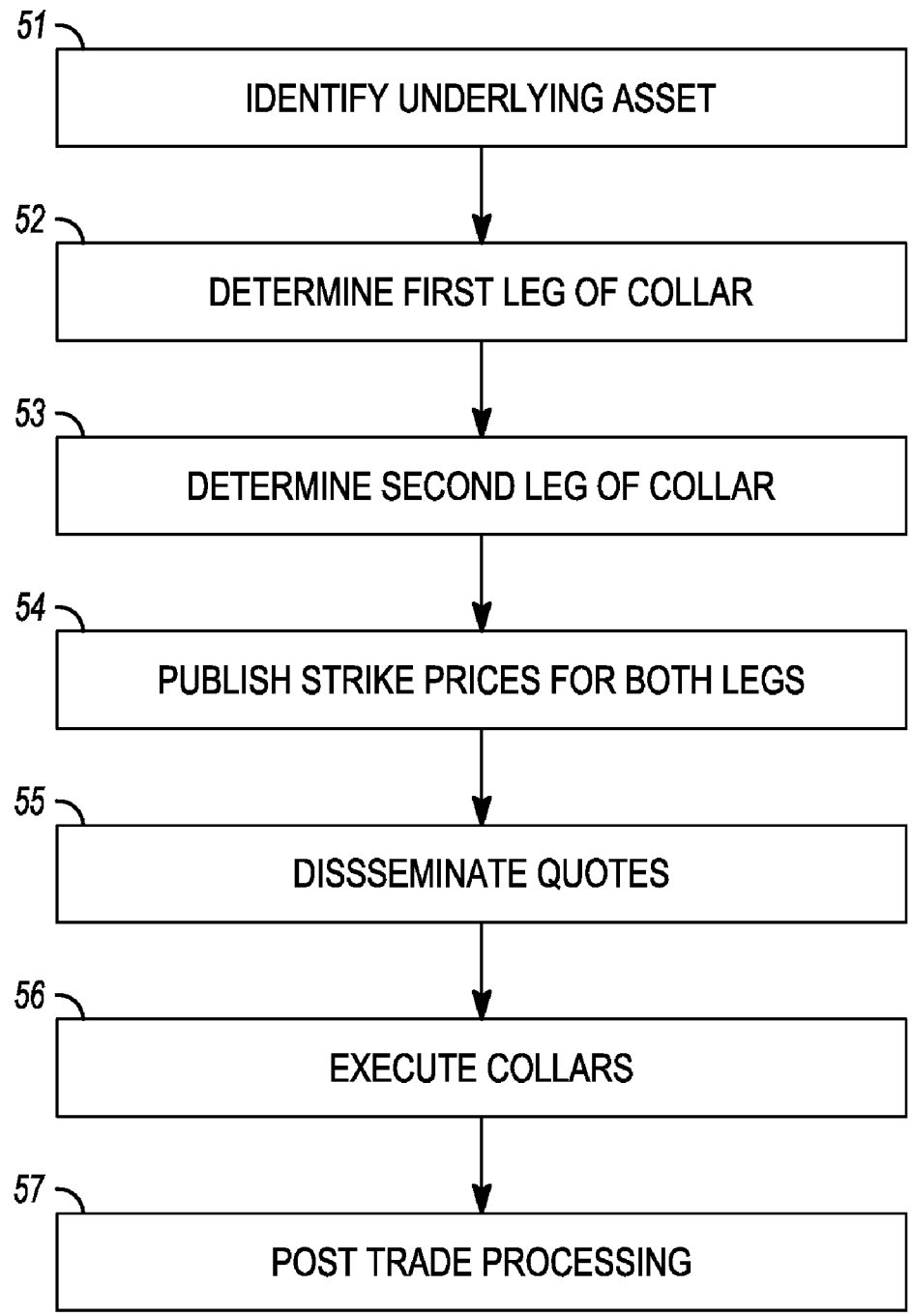
FIG. 7 is a flowchart describing a method for creating and trading packaged standard option collars on an exchange.

A method of creating and trading a zero cost, or near zero cost collar comprising a package of standard exchange traded option contracts is depicted in the flow-chart 200 shown in FIG. 7. In a first step S1, the exchange identifies an underlying asset for which a collar option package is to be offered. The second step S2 is to determine a first leg of the collar. This may involve selecting the most appropriate standard call option or standard put option for the collar. The determination of the first leg of the collar will influence the determination of the second leg in step S3. If the first leg determined is a call option, then the second leg will be a put option, and vice-versa. The second leg is selected so as to offset, as nearly as possible, the revenue from the first leg. Once the legs of the collar have been established, the strike prices for both legs are published at step S4. Quotes for the packaged collars are disseminated in step S5. Investor may place orders or place bids and offers for the packaged collars based on the published quotes. At step S6 collars are executed by matching investors taking opposite positions for each of the legs of the collar. Finally, at step S7, post trade processing is performed to account for the transactions comprising the executed collar.

Next we will consider the individual steps of the method 200 in greater detail. The first step S1, identifying the underlying asset, may be a fairly arbitrary decision. The exchange on which the collars will be traded selects the underlying assets for which it will make collar packages available. A fundamental factor in selecting an asset will be the exchange's desire to list collar packages that will be of interest to traders and in which investors will want to take positions. This may coincide with assets for which trading in standard options is already heavy, or assets that are highly volatile, or some other factor or group of factors that would indicate potential investor interest in packaged collars based on the asset. The underlying asset may be a tangible asset such as a stock or an intangible asset such as an index, interest rate, or the like. Essentially packaged collars may be assembled around any underlying asset, index or other indicator for which standard option contracts are traded on the exchange.

Since a zero-cost or near-zero-cost collar constitutes the sale of an out-of-the-money call option and the purchase of an offsetting out-of-the-money put option, it is immaterial in step S2 whether the call leg or the put leg is determined first. Once the underlying asset has been defined in step S1, determining the first and second legs of the collar essentially means determining the strike prices for the corresponding call and put options. The strike price of the first leg of the collar is determined by multiplying a "strike setting price" of the underlying asset by a "moneyness factor." Determination of the strike setting price will vary depending on how the collars are listed. For example, the collars may be established and the strike prices for the call and put options may remain stable and valid for a predefined period of time, such as an entire trading day. Alternatively, the strike prices may be continually recalculated and updated in real time to reflect price changes in the underlying asset throughout the course of a trading day. In the first case, in which the collar strike prices remains valid throughout an entire day, the strike setting price may be set equal to the underlying asset's closing price the day before. If the strike prices are to be calculated in real time, the strike setting price will be set equal to the current market price of the underlying asset each time the strike prices are calculated.

In either case, whether the strike prices of the legs are established for a finite period of time or calculated dynamically, the strike price of the first leg is determined by multiplying the strike setting price by the moneyness factor. The moneyness factor determines how far out-of-the-money the first leg of the collar will be. If the strike price of the call leg is being determined first, the moneyness factor may be calculated by adding 1.00 plus the desired percentage out-of-the-money of the call leg expressed as a decimal. For example, if the first leg is to be a 5% out-of-the-money call option the moneyness factor would be equal to 1.00+0.05=1.05. If the strike price of the put leg is to be determined first, the moneyness factor is calculated in much the same way, except that the desired percentage out-of-the-money (again expressed as a decimal) is subtracted from 1.00 rather than added. Thus, if the first leg is to be a 3% out-of-the-money put option, the moneyness factor would be equal to 1.00−0.03=0.97.

On exchange traded collars the two legs of the collars must be confined to standard option contracts that are traded on the exchange. When the strike setting price is multiplied by the moneyness factor the result typically will not coincide with the strike price of a standard option contract. Accordingly, the first leg of the collar may be selected as the standard option contract (call or put) having a strike price nearest the desired strike price. Of course other rounding rules could also be used, such as always using the standard option contract having a strike price nearest and above, or nearest and below the desired strike price, and so forth.

Once the first leg of a collar has been determined, the second leg is determined by identifying a standard option contract of the opposite type and based on the same underlying asset. The second leg is chosen to have, as nearly as possible, the same option price as the first leg. Thus, for example, if the first leg is a call option with a strike price of $105 and an option price of 2.7, the second leg will be the standard put contract for the same underlying asset whose option price is nearest 2.7. Since an investor entering the packaged collar will be selling the call leg and buying the put leg, the transaction will cost the investor nothing if the option prices for the put and call are identical. If the option prices for the first and second legs are slightly different, the collar may have a small price associated with it, or the investor may actually receive a small payment if the price of the call option exceeds that of the put.

Once both legs of the collar have been determined, the exchange must notify its users of the collar and of the strike prices for each leg of the collar, as called for in step S4. The exchange may accomplish this by publishing the information on a website, by publishing an informational notice, notifying vendors, and/or any other communication channels.

In step S5 the exchange disseminates quotes for the collar packages it has created. A number of alternatives are possible for this step. For example, the exchange may develop an algorithm that identifies the best bid and best offer for each leg of a collar, and quote indicative collar bids and offers based on the component legs. For example, the bid for a collar could be based on the bid of the call leg and the offer of the put leg. The collar may be quoted in collar terms, i.e., as a debit or credit, based on the amount paid or received from taking a position in the collar package.

Alternatively, Market Makers may quote firm prices at which collars may be executed. Market Maker quotes may be disseminated instead of or in addition to exchange published indicative quotes. Both the exchange's indicative quotes and the Market Maker firm quotes may be disseminated over a proprietary network, such as the Chicago Board Options Exchange (CBOE) Futures Network (CFN) or the options price reporting authority (OPRA), or the like.

Customer orders for packaged collars are executed in step S6. In a first alternative investors may place orders based on the exchange's indicative quotes. A matching engine receives orders and executes both legs of the spread simultaneously at or better than the indicative quoted market prices. If an order for a collar turns out to be non-executable due to changes in the market, the order can be processed according to the order specifications. If an investor places an order based on a firm Market Maker quote, the Market Maker automatically takes the opposite side of each leg of the collar. The exchange's matching facility executes the orders at or better than the quoted market prices.

Finally, the post trade processing of step S7 may take on any number of forms. These will depend mainly on how the exchange decides to handle executed collars. For example, because the collars created according to embodiment described comprise standard option contracts already traded individually on the exchange, once a collar is executed the individual components can be treated individually and processed and traded separately. In one alternative, the legs may be reported individually as separate puts and calls. A tag may be placed on the legs for tracking purposes to indicate that they were once part of a collar. The tag may be withheld from customers, or the tag may remain with the legs so that it may be reported to customers that they were legs of a zero cost collar transaction.

An alternative is to create collars having inseparable legs. Although each leg comprises a standard option, the legs of an inseparable collar can only be traded together. Inseparable legged collars would not simply become individual standard option contracts. Rather, open interests from inseparable leg collars will stand alone and not be merged with the open interests in the call and put series underlying the collar. Such inseparable legged collars may continue to be traded and quoted as standalone products with unique trading symbols even though they may be traded with the standard options of the same underlying asset and in the same crowd or with the same designated primary market maker as the standard options.

Next we will apply the method of the present invention to create a near zero cost collar based on the S&P500 index. The call leg of the collar will be derived first employing a 5% moneyness factor. For ease of description the strike prices will be valid for a period of time based on the S&P500's previous day's close, rather than being calculated dynamically. For purposes of the example, we will assume a previous day's close of 1206.8.

Figure 8:
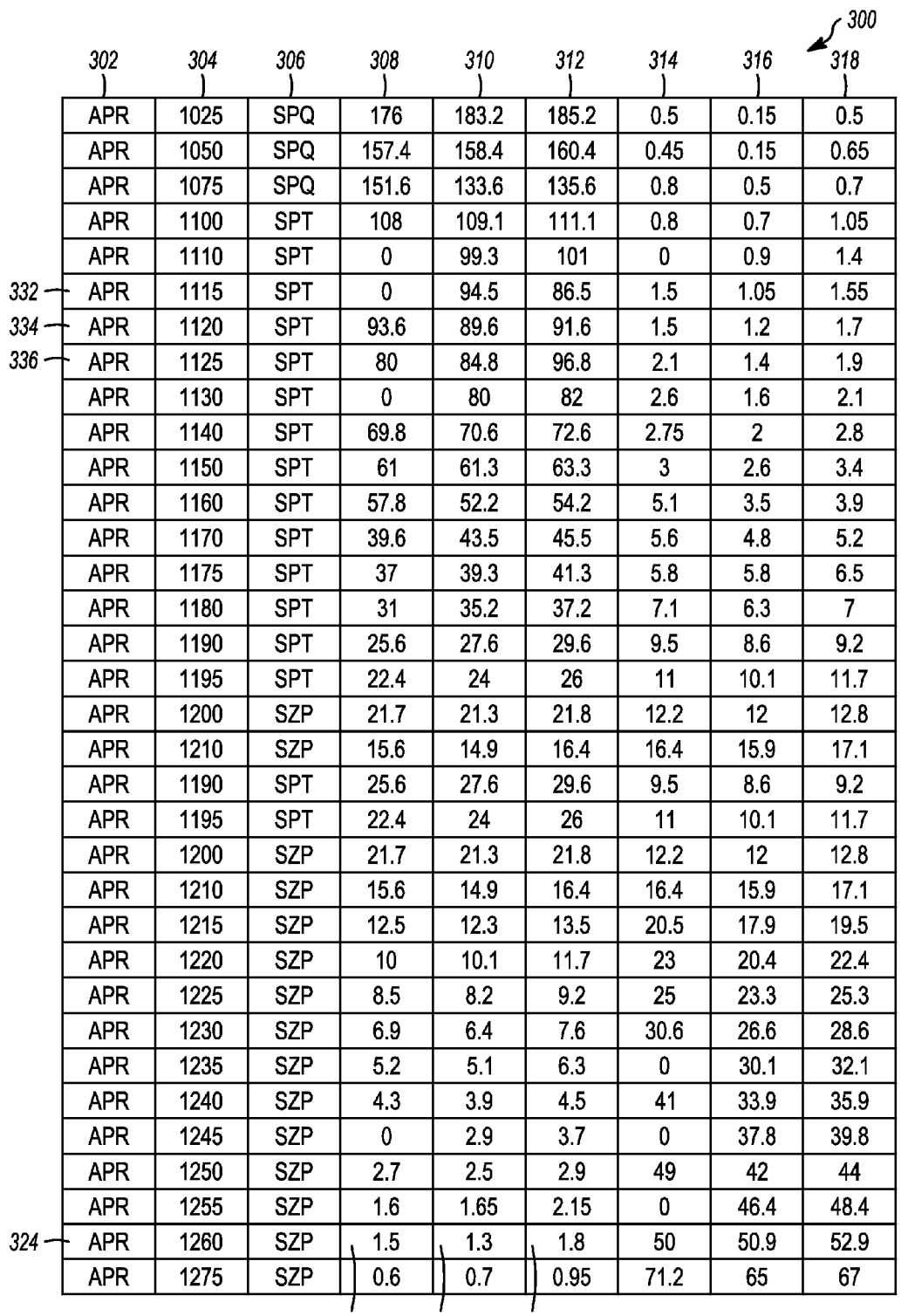
FIG. 8 is a listing of standard options based on the S&P500 index.

FIG. 8 shows sample listings 300 of a plurality of standard exchange traded option contracts based on the S&P500. Each series listing includes the expiration month 302, the strike price 304, the trading symbol 306, the option price for the last executed call option 308, the current best bid on a call option 310, the current best offer on a call option 312, the option price for the last transacted put option 314, the current best bid for a put option 316, and the current best offer for a put option 318.

The call leg of the collar is to be calculated first using a moneyness factor of 5%. The strike price of the call leg is calculated by multiplying the previous day's S&P500 close, 1206.8, by a value equal to one plus the moneyness factor expressed a decimal, or, in this case 1.00+0.05=1.05. This results in a calculated desired strike price of 1267.14. 1267.14 does not correspond to the strike price of any of the standard S&P500 call options. The standard S&P500 call option having a strike price nearest the calculated desired strike price of 1267.14 is the April 1260 SZP call option 324. The last transacted price 326 for the April 1260 SZP call option was 1.5. The current bid 328 is 1.3 and the current offer 330 is 1.8. Since this is the standard call option having a strike price nearest the desired calculated strike price, this series 324 is selected for the first leg of the collar. The sale price of a call option in this series will be somewhere between the current 1.3 bid and 1.8 offer. For purposes of establishing a collar the mid-point between the current bid 326 and current offer 328 may be used to establish the price of the call option, although other methods of determining the prices may also be used. For example the last transacted price, the current bid, the current offer, or some other price may be used to establish the option price of the first leg of the collar. In this case, the mid-point between the current bid of 1.3 and the current offer 1.8 for the 1260 SZP call option is 1.55. This is the approximate price an investor buying the collar could expect to receive from the sale of a 1260 S&P500 call option with an April expiration.

The estimated option price for the first leg of the collar is then used to determine the second leg. The second leg is the opposite of the first leg. In this case since the first leg determined was the call leg, so the second leg will be a put. Specifically, the second leg will be a standard put option that has an option price that comes closest to offsetting the 1.55 option price of the first leg. Thus, we wish to identify a put option having a current bid and current offer whose midpoint is closest to 1.55. Reviewing the bids 316 and offers 318 for S&P500 put options in FIG. 8, we see that only three series of S&P500 put options have bids and offers that straddle the desired option price of 1.55. These are the 1115 SPT put 332 which has a current bid of 1.05 and current offer of 1.55; the 1120 SPT put 334 which has a current bid of 1.2 and current offer of 1.7; and the 1125 SPT put 336 that has a current bid of 1.4 and a current offer of 1.9. The mid-point between the bid and offer for the 1115 SPT put option is 1.30, 1.45 for the 1120 SPT put and 1.65 for the 1125 SPT put. In this case, the estimated price of the desired call 1.55 is directly between the mid-points of the bid and offer prices for the 1120 SPT put and the 1125 SPT put. Thus either could be selected as an appropriate second leg of the present collar. However, since the last transacted price for the 1120 SPT put option, 1.5, is much closer to the desired option price than the last price transacted for the 1125 SPT put option, which is 2.1, the 1120 SPT put option 334 will be selected for second leg of the collar.

Now that the individual legs of the collar have been determined it is necessary to quote prices for the package of options. Recall that the investor buying the collar will be both selling a call and buying a put. Since the prices used in determining the legs of the collar were the midpoints between the current bids and offers of the put and call options themselves, these same midpoint prices may be used to establish a price for the collar. In this case, the price the investor must pay for the put option is subtracted from the price the investor receives from selling the call option. The mid-point between the current bid and current offer for the call leg is 1.55. The mid-point between the current bid and current offer for the call leg is 1.45. Thus, an investor "buying" or taking a long position in the collar can expect to receive money on the transaction. Accordingly, a price of −0.10 may be quoted for the collar.

However, option prices are traditionally quoted in terms of bids and offers. A bid is the maximum amount an investor is willing to pay to buy a position, and an offer is the minimum an investor is willing to accept to sell a position. Since the investor buying the position typically wants to pay as little as possible and the investor selling the position wants to receive as much as possible, the current best offer will typically exceed the current best bid. The difference between the two is known as the spread. With a collar, the investor who is "buying" the collar, or taking a long position with respect to the collar, is both selling a call option and buying a put option. The price the long investor must "pay" for the collar (he may actually receive money depending on the ultimate price of the legs) will be determined by how much another investor is willing to pay for the call option, and how much the other investor is willing to accept for the put option. These prices can be best determined by viewing the current bids and offers for the legs individually.

In the present example, the best bid for a 1260 SZP call option is 1.3. An investor may be able to get a higher price than 1.3, but an order is certain to clear at 1.3. Similarly, the best offer for an 1120 SPT put option is 1.7. An investor may be able to get a lower price than 1.7, but an order to purchase an 1120 SPT put is sure to clear at 1.7. Accordingly, a collar is certain to be executable when the long investor offers the call option for 1.3 and bids 1.7 for the put option. In other words, the investor will have to pay 0.4 to ensure the collar transacts.

On the opposite side of the transaction, the investor who is "selling" the collar, or taking the short position with respect to the collar, is both buying the call option and selling the put. The amount the short investor will "receive" for the collar (he may actually have to pay money to take the short position depending on the ultimate price of the individual legs) will be determined by how much another investor is willing to sell the call option for and how much the other investor is willing to pay for the put option. In the present example, the best offer for a 1260 SZP call option, the first leg of the collar, is 1.8. An investor may be able to buy a 1260 SZP call option at a price better than 1.8, but since this is a standing offer an order for 1.8 is certain to transact. The best bid for a 1120 SPT put option is 1.2. An investor may be able to get a higher price for selling a 1120 SPT put option, but since this is a standing bid an order is certain to transact at 1.2. Accordingly, a collar is certain to be executable when the short investor bids 1.8 for the call option and offers the put option for 1.2. In other words, the short investor will have to pay 0.6 to ensure that the collar transacts.

In the first scenario the investor seeking to "buy" the collar, or the investor taking a long position in the collar, must pay the investor 'selling" the collar or taking the short position 0.4. In the second scenario the investor selling the collar must pay the investor buying the collar 0.6. Clearly, an investor desiring to take the long position in the collar would prefer the second scenario. Conversely, an investor seeking to take the short position would prefer to receive the 0.4 of the first pricing scenario. The difference between these two prices 0.4 to −0.6 (from the perspective of the amount paid by the investor buying the collar) may be considered the spread between the best bid, 0.4, and the best offer −0.6. An order to purchase a collar is certain to transact at 0.4, and an order to sell is certain to transact at −0.6. The actual market price for the collar will likely be between these two extremes.

FIG. 9 shows a listing 400 of the 5% out-of-the-money S&P500 collar. The listing 400 shows the strike setting price of the underlying index 402, the call strike calculation 404, the strike prices of the standard options above and below the calculated call strike 406, 408, the standard call option having a strike closest to the 5% out-of-the-money strike 410, and the put strike 412 based on zero or near zero cost criteria. The listing 400 further includes the listings for the legs of the collar, namely, the selected put option 413 and the selected call option 414. The listing next highlights the most relevant bids and offers for the component options, including the 5% out-of-the-money call bid 416, and the zero-cost put offer 418, the 5% out-of-the-money call option offer 420 and the zero cost put option bid 422. From these, collar bid and offer quotes 424, 426 are derived. With the information included in the listing 400 investors may determine whether or not they wish to take a position in the listed collar.

Figure 10:
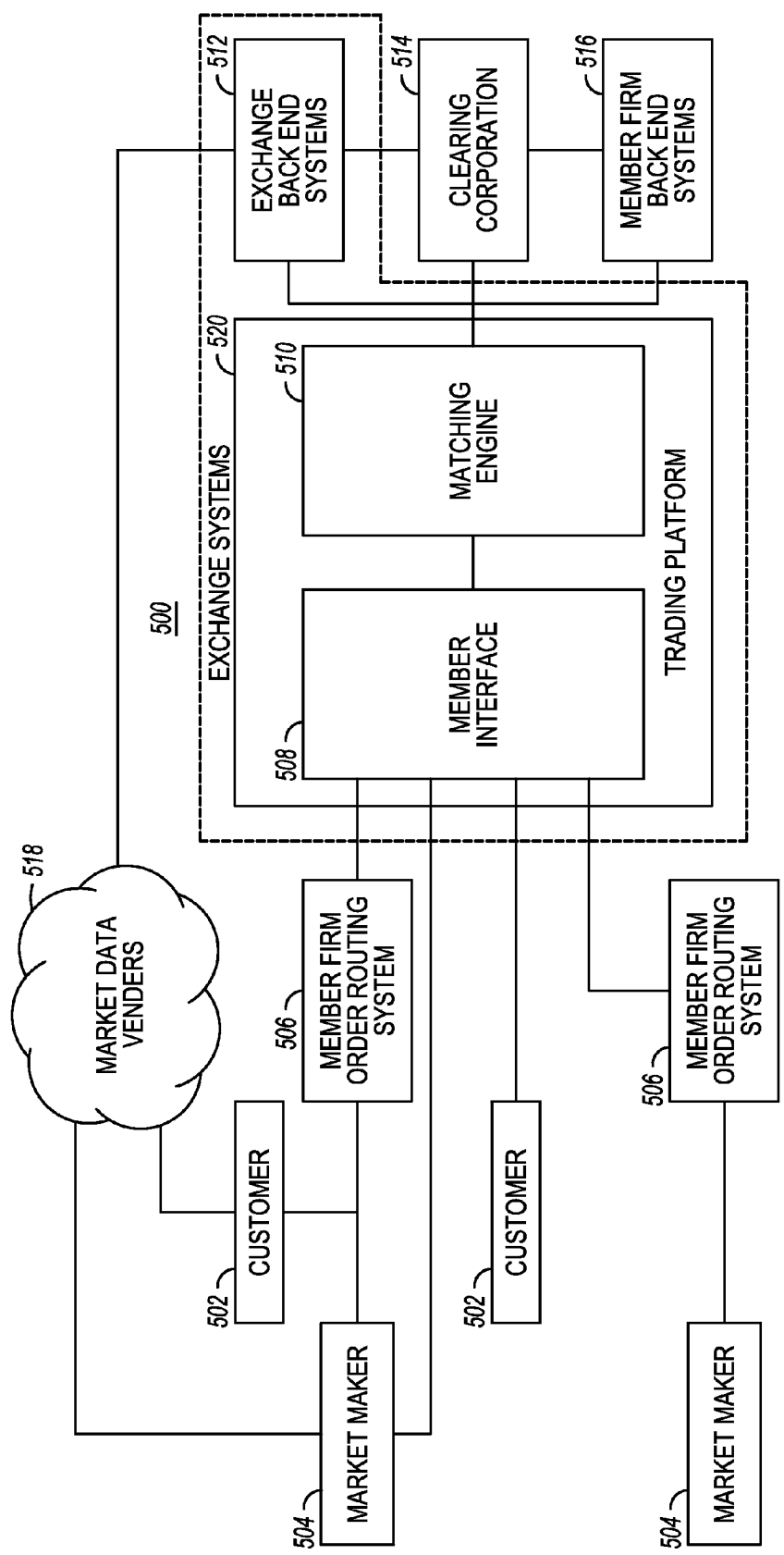
FIG. 10 is a block diagram of an electronic trading facility for trading packaged standard option collars are published.

FIG. 10 shows an electronic trading system 500 which may be used for listing and trading packaged collar options. The system 500 includes components operated by an exchange, as well as components operated by others who access the exchange to execute trades. The components shown within the dashed lines are those operated by the exchange. Those outside the dashed lines are operated by others, but nonetheless are necessary for the operation of a functioning exchange. The exchange components of the trading system 500 include an electronic trading platform 520, a member interface 508, a matching engine 510, and backend systems 512. Backend systems not operated by the exchange but which are integral to processing trades and settling contracts are the Clearing Corporation's systems 514, and Member Firms' backend systems 516.

Market Makers 504 may access the trading platform 520 directly through the member interface 508, and quote prices for packaged collar options. Non-member Customers 502, however, must access the exchange through a Member Firm. Customer orders are routed through Member Firm routing systems 506. The Member Firms' routing systems 506 forward the orders to the exchange via the member interface 508. The member interface 508 manages all communications between the Member Firm routing systems and Market Makers' personal input devices 504; determines whether orders may be processed by the trading platform; and determines the appropriate matching engine for processing the orders. Although only a single matching engine 510 is shown in FIG. 10, the trading platform 520 may include multiple matching engines. Different exchange traded products may be allocated to different matching engines for efficient execution of trades. When the member interface 502 receives an order from a Member Firm routing system 506, the member interface 508 determines the proper matching engine 510 for processing the order and forwards the order to the appropriate matching engine. The matching engine 510 executes trades by pairing corresponding marketable buy/sell orders. Non-marketable orders are placed in an electronic order book. If the market moves and the unexecuted orders on the electronic order book become marketable, they are executed at that time.

Once orders are executed, the matching engine 510 sends details of the executed transactions to the exchange backend systems 512, to the Clearing Corporation systems 514, and to the Member Firms' backend systems 516. The matching engine also updates the order book to reflect changes in the market based on the executed transactions. Orders that previously were not marketable may become marketable due to changes in the market. If so, the matching engine 510 executes these orders as well.

The exchange backend systems 512 perform a number of different functions. For example, contract definition and listing data originate with the exchange backend systems 512. Pricing information for packaged collar options is disseminated from the exchange backend systems to market data vendor 518. Customers 502, market makers 504, and others may access the market data regarding packaged collar options via, for example, proprietary networks, on-line services, and the like.

Figure 11:
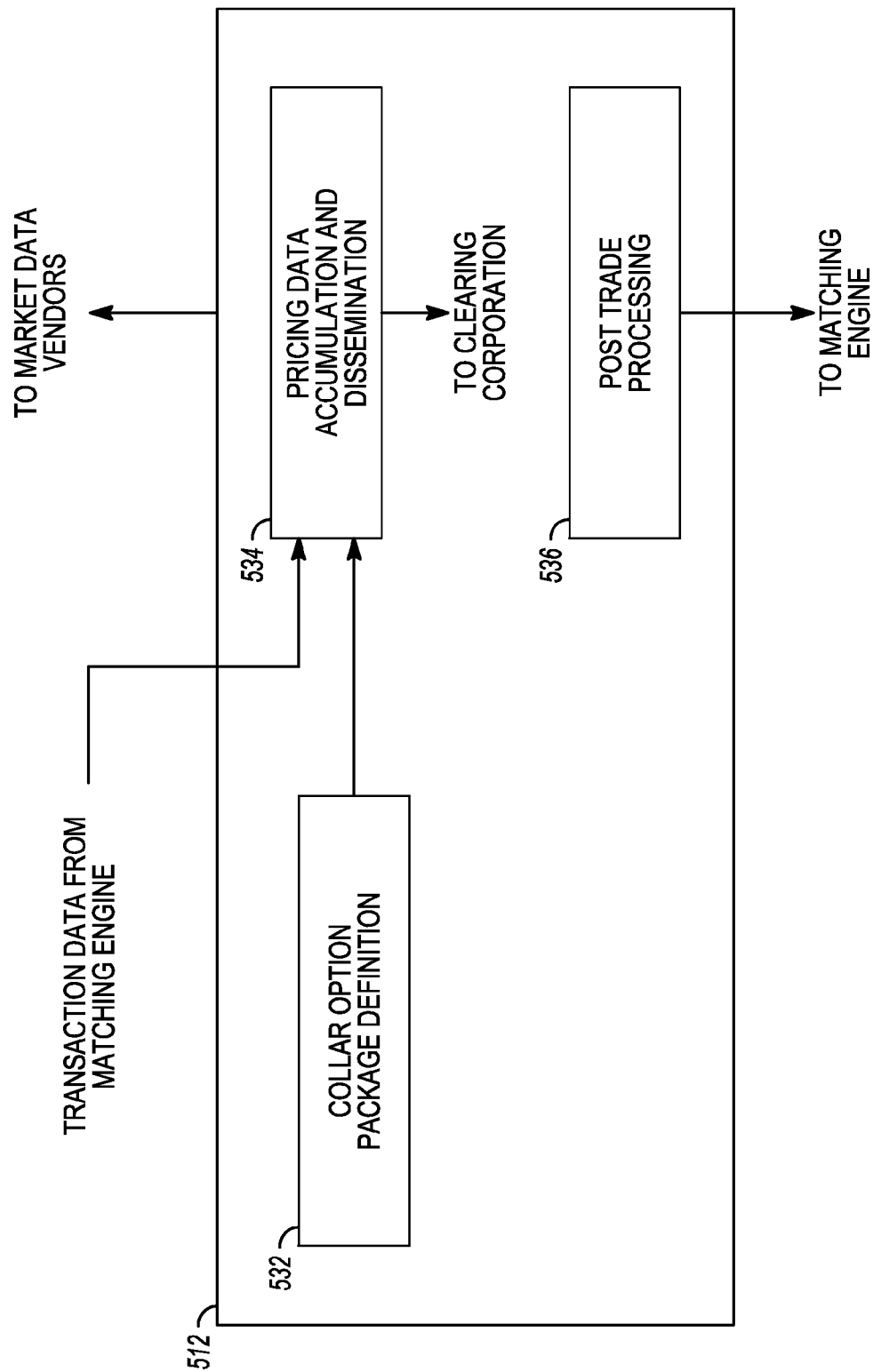
FIG. 11 is a block diagram of backend systems supporting trading packaged standard options contracts.

FIG. 11 shows the exchange backend systems 512 needed for trading packaged collar options in more detail. A collar options package definition module 532 stores all relevant data concerning the packaged options collar to be traded on the trading platform 520, including the underlying asset, the strike prices of the first and second legs, the expiration date, collar symbol, etc. A pricing data accumulation and dissemination module 535 receives contract information from the packaged collar options contract definition module 532 and transaction data from the matching engine 510. The pricing data accumulation and dissemination module 548 provides the market data regarding open bids and offers and recent transactions to the market data vendors 518. The pricing data accumulation and dissemination module 548 also forwards transaction data to the Clearing Corporation. Finally, post trade processing module 536 performs post trade processing according to the specifications of the collar package. For example, the post trade processing module 536 may track the legs of the collars, ensuring that inseparable legged collars remain together as a package, or simply accumulating statistics regarding the popularity of a particular collar package, and so forth. Such information may be supplied back to the matching engine to ensure that collar positions are always matched with collar positions, and that the individual legs are not traded separately. The backend systems 512 may include one or more computer processors and communications devices containing programming code configured to carry out the above mentioned functions and steps.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. An exchange for creating and trading a package of option contracts, the exchange comprising:
    an exchange backend system, the exchange backend system comprising a processor configured to:
        identify an underlying asset for which standard options contracts are traded on the exchange at the electronic trading platform;
        select one of a call option contract or a put option contract for the underlying asset as a first leg of an option collar;
        select an unselected one of the call option contract or the put option contract for the underlying asset as a second leg of the option collar, wherein the second leg is selected based on a strike price of the first leg; and
        list the first and second legs of the option collar as a single packaged instrument on the exchange;
    and
    an electronic trading platform in communication with the exchange backend system, the electronic trading platform configured to:
        accept orders from investors to take positions in the packaged instrument; and
        execute orders by matching orders to take opposite positions in the packaged instrument.

2. The exchange of claim 1, wherein to select the first leg of the option collar the processor is configured to calculate a desired strike price by multiplying a current value of the underlying asset by a moneyness factor and to select a standard option contract listed on the exchange having a strike price closest to the desired strike price.

3. The exchange of claim 2, wherein the processor is configured to determine the moneyness factor based on a desired spread ratio between the current value of the underlying asset and a strike price of the first leg of the option collar.

4. The exchange of claim 3, wherein the first leg of the option collar is a call option and wherein to calculate the moneyness factor the processor is configured to add the desired spread ratio between the strike price of the first leg of the option collar and the current value of the underlying asset to one.

5. The exchange of claim 3, wherein the first leg of the option collar is a put option and wherein to calculate the moneyness factor the processor is configured to subtract the desired spread ratio between the strike price of the first leg of the option collar and the current value of the underlying asset from one.

6. The exchange of claim 2, wherein the option contract selected as the first leg of the option collar has a first leg option price associated therewith, and wherein the processor is further configured to select as the second leg a standard option contract listed on the exchange having a second leg option price substantially offsetting the first leg option price.

7. The exchange of claim 1, wherein the electronic trading platform is configured to execute the first and second legs as independent standard options contracts that may be traded freely on the exchange.

8. The exchange of claim 1, wherein the electronic trading platform is configured to execute the first and second legs as an inseparable instrument such that investors may only take positions in, and close positions in, both the first and second legs simultaneously.

9. The exchange of claim 1, wherein the processor is configured to select and maintain as valid the first and second legs for a defined period of time.

10. The exchange of claim 1, wherein the processor is configured to select the first and second legs in real time.

11. An exchange for creating and trading a package of option contracts, the exchange comprising:
an electronic trading platform configured to receive and execute orders; and
an exchange backend system, the exchange backend system comprising a processor configured to:
identify one of an out-of-the-money standard call option or an out-of-the-money standard put option at the exchange, the one of the out-of-the-money standard call option or the out-of-the-money standard put option having a first option price, wherein the out-of-the money standard call option and the out-of-the money standard put option are based on the identified underlying asset;
identify an other of the out-of-the-money standard call option or the out-of-the-money standard put option at the exchange, the other of the out-of-the-money standard call option or the out-of-the-money standard put option having a second option price which substantially offsets said first option price;
list, via a pricing data accumulation and dissemination module of the exchange backend system, the out-of-the-money standard call option and the out-of-the-money standard put option together as a package on the exchange; and
wherein both the out-of-the-money standard call option and the out-of-the-money standard put option are placed in a single order for the package.

12. The exchange of claim 11, wherein the exchange is configured to receive a first position in the package for a short position in the out-of-the-money standard call option and a long position in the out-of-the-money put option.

13. The exchange of claim 12, wherein the exchange is configured to receive a second position for the package for both a long position in the out-of-the-money call option and a short position in the out-of-the-money put option.

14. The exchange of claim 12, wherein the exchange is configured to receive a second position for the package for a long position in the out-of-the-money call option and a third position for a short position in the out-of-the-money call option.

15. The exchange of claim 11, wherein the exchange is configured to permit trading of the out-of-the-money standard call option and the out-of-the-money standard put option comprising the listed package as separate standard options after receiving the first position in the package.

16. The exchange of claim 11, wherein the exchange is configured to only permit the out-of-the-money standard call option and the out-of-the-money standard put option to be traded together as the package.

17. The exchange of claim 11, wherein to identify one of the out-of-the-money standard call option or the out-of-the-money standard put option the processor is configured to identify a desired first leg strike price, wherein the desired first leg strike price is a desired percentage value above or below the market price of the underlying asset, and the identified one of the out-of-the-money standard call option or the out-of-the-money standard put option is a standard call option or a standard put option having a strike price nearest the desired first leg strike price.

18. The exchange of claim 11, wherein the first option price is defined as a midpoint between a best bid and best offer for the identified one of the out-of-the-money standard call option or the out-of-the-money standard put option, and the second option price is a midpoint between a best bid and best offer for the other of the out-of-the-money standard call option or the out-of-the-money standard put option.

19. The exchange of claim 11, wherein the processor is further configured to publish bids and offers for the package of options, where the bids comprise a price investors are willing to pay to take both a short position in the identified out-of-the-money call option and a long position in the identified out-of-the-money put option, and the offers comprise a price investors are willing to pay to take both a long position in the identified call option and a short position in the identified put option.

* * * * *